US007941609B2

(12) United States Patent
Almog

(10) Patent No.: US 7,941,609 B2
(45) Date of Patent: May 10, 2011

(54) HTTP ACCELERATION BY PREDICTION AND PRE-FETCHING

(75) Inventor: Itai Almog, Tel-Aviv (IL)

(73) Assignee: Microsoft Corporation, Redmond, WA (US)

(*) Notice: Subject to any disclaimer, the term of this patent is extended or adjusted under 35 U.S.C. 154(b) by 767 days.

(21) Appl. No.: 11/710,155

(22) Filed: Feb. 23, 2007

(65) Prior Publication Data

US 2008/0208789 A1    Aug. 28, 2008

(51) Int. Cl.
*G06F 12/00* (2006.01)
*G06F 15/16* (2006.01)

(52) U.S. Cl. ........ 711/137; 711/118; 711/126; 711/213; 709/203; 709/217; 709/219; 709/231

(58) Field of Classification Search .................. 709/203, 709/217, 219, 231; 711/118, 126, 213
See application file for complete search history.

(56) References Cited

U.S. PATENT DOCUMENTS

| | | | |
|---|---|---|---|
| 5,802,292 | A | 9/1998 | Mogul |
| 6,055,569 | A | 4/2000 | O'Brien et al. |
| 6,067,565 | A | 5/2000 | Horvitz |
| 6,085,226 | A | 7/2000 | Horvitz |
| 6,385,641 | B1 | 5/2002 | Jiang et al. |
| 6,766,422 | B2 | 7/2004 | Beyda |
| 6,868,439 | B2 | 3/2005 | Basu et al. |
| 6,959,318 | B1 | 10/2005 | Tso |
| 6,981,017 | B1 | 12/2005 | Kasriel et al. |
| 6,993,591 | B1 | 1/2006 | Klemm |
| 7,113,935 | B2 | 9/2006 | Saxena |
| 2004/0254943 | A1* | 12/2004 | Malcolm ................ 707/100 |
| 2005/0198309 | A1* | 9/2005 | Li et al. ................ 709/227 |
| 2007/0156876 | A1* | 7/2007 | Sundarrajan et al. ...... 709/223 |
| 2008/0201331 | A1* | 8/2008 | Eriksen et al. ............. 707/10 |

FOREIGN PATENT DOCUMENTS

WO    WO03032200 A1    4/2003

OTHER PUBLICATIONS

Chinen, et al., "An Interactive Prefetching Proxy Server for Improvement of WWW Latency", INET'97, Jun. 1997, 10 pages.
Cohen, et al., "Efficient Algorithms for Predicting Requests to Web Servers", In Proceedings of IEEE INFOCOMM '99, Mar. 1999, 26 pages.
Padmanabhan, et al., "Using Predictive Prefetching to Improve World Wide Web Latency", ACM SIGCOMM, Jul. 1996, 15 pages.
Wang, et al., "Prefetching in World Wide Web", In Proceeding of Global Internet, Nov. 1996, 12 pages.

\* cited by examiner

*Primary Examiner* — Kevin L Ellis
*Assistant Examiner* — Mehdi Namazi

(57) ABSTRACT

Described is a technology by which high latency problems with respect to web requests are reduced by having a web proxy server predict and pre-fetch content, in parallel, that is to be requested by a client. The web proxy analyzes a main web page requested by a client to predict subsequent client requests. The web proxy pre-fetches content before the client requests it, by making concurrent requests for the page's embedded objects that exceed the client's limited number of (e.g., two) connections. In one example, the web proxy sends HTTP requests substantially in parallel to a web server, thereby reducing overall latency. In another example, the web proxy server sends parallel requests to a remote web proxy coupled to a web server. The remote web proxy requests only a limited number of objects (e.g., two) at a time, but does so over fast (low latency) connections to the web server.

15 Claims, 4 Drawing Sheets

HTTP ACCELERATION BY PREDICTION AND PRE-FETCHING

BACKGROUND

When a user browses a web site, the communications path from the client to the web server hosting the web site sometimes suffers from high latency conditions. For example, communicating with a geographically distant web server may correspond to a latency time on the order of one-half a second. The result is a poor user experience reflected by a long delay before pages are displayed. This is often the situation with intranet web sites located on main offices (or headquarters) when accessed from a remote branch office, because in a typical main office/branch office deployment, there is usually only a single instance of an internal web server, and it may be geographically far away from remote clients.

One of the reasons for such a long delay is the serialized way web browsers download web content. More particularly, according to the RFC2616 standard, web browsers should have up to two concurrent connections to each domain. Because contemporary web pages tend to include several embedded objects including icons, text, images, scripts and CSS (cascading style sheet) files, the web browser needs to trigger several HTTP requests to get all of the objects. With a limit of up to two concurrent connections, this can take a relatively long time.

Typical web proxies do not solve this problem when they do not have the requested content cached, such as when the content has not been previously requested, or when it cannot be cached, e.g., because the internal web site requires user authentication as it includes sensitive/restricted company data. For example, consider a user located in a branch office accessing an intranet web site hosted by a web server located at a geographically remote data center or office headquarters. In this example, the connection between the branch office and the headquarters has a latency (or round trip time) of 300 milliseconds. When the web browser downloads the main web page, the browser recognizes that fifty additional embedded objects need to be downloaded. Assuming this is done using two concurrent connections as specified by the RFC2616 standard, only two objects may be requested at a time, whereby twenty-five additional more round trip times are required before the page can be fully displayed. With a latency of 300 milliseconds, obtaining the main web page's full set of content takes approximately seven-and-a-half seconds, which provides a poor user experience.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a web proxy server analyzes content described on a main web page requested by a client to predict likely subsequent requests from that client. The web proxy server pre-fetches at least some of the content before that content is requested by the client, including by making more than two concurrent requests for objects described on the main web page. In one example implementation, the web proxy server sends more than two HTTP requests for objects to a web server, thereby reducing overall latency. In another example implementation, the web proxy server sends HTTP requests for objects (e.g., all objects in parallel requests) to a remote web proxy coupled to a web server; the remote proxy only requests a limited number of (e.g., two) objects at a time from the web server, however the high latency issues are avoided by having each of the embedded objects requested in parallel over the high latency (slow) connection.

In one example implementation, the web proxy server may cache objects for returning to the client when requested, as well as to other clients. The web proxy server differentiates between cacheable objects and non-cacheable objects, and removes any stored non-cacheable objects once requested by and returned to the client, or if not requested by the client within a time interval, so that other clients or users cannot obtain the object.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards reducing overall latency by using a web proxy server that predicts objects a client web browser will be requesting next, and pre-fetches those objects to provide a faster response time as perceived by a user of that client. In general, the web proxy server is geographically close to the client, whereby the latency is low between the client and web proxy server; the acceleration is gained by having the web proxy server predict and pre-fetch the objects that the client will be requesting in a parallel way into a storage at the web proxy server. When the client requests an object, the object is already at the geographically close web proxy server.

As will be understood, this technology provides numerous benefits when high latency conditions exist on the communications path to a remote web server, regardless of the cause of the high latency conditions. Further, the client browser does not have more than a limited number of web connections at a time, e.g., two to comply with RFC standards. However, in one example implementation, the web proxy server accomplishes acceleration by ordinarily having more than the limited number of web connections (e.g., two) outstanding web requests at a time. Thus, an alternative implementation is described in which a web proxy server at the client end communicates with a web proxy server at the web server. In this alternative, the web server only needs to handle the limited number of web requests at a time, but the web proxy servers' intra-communication, which is not constrained by RFC standards, may have essentially any number of "connections" constrained only by practical considerations.

Thus, as will be understood, the technology described herein is not limited to any type of configuration. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and networking in general.

Figure 1:
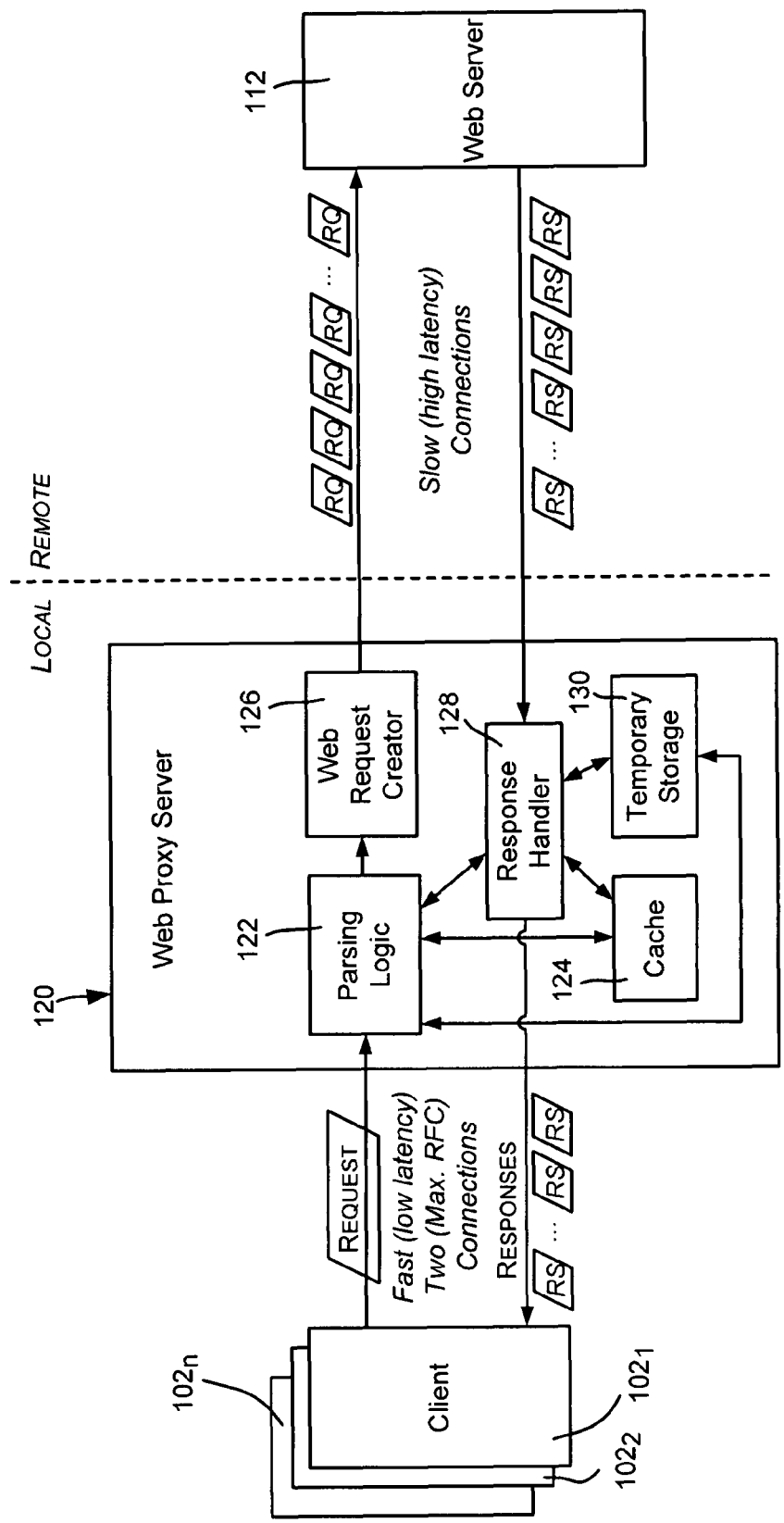
FIG. 1 shows an illustrative example of a network having a web proxy server with prediction and pre-fetching capabilities that retrieve page objects fog a local client in a manner that reduces overall latency effects.

Turning to FIG. 1, there is shown an example network in which clients $102_1$-$102_n$ make web requests directed towards a web server 112. The clients $102_1$-$102_n$ may have no concept of where the web server is located, but as will be understood, if the web server 112 is remotely located or otherwise hap a high latency connection thereto, acceleration via prediction and pre-fetching will significantly improve the time to retrieve objects. In the event that the web server is geographically close or otherwise has a low latency connection, no significantly negative effects will result from the prediction and pre-fetching.

To accomplish acceleration via prediction and pre-fetching, a web proxy server 120 (e.g., an edge server such as an Internet Security and Acceleration, or ISA Server available from Microsoft Corporation), receives requests from the clients $102_1$-$102_n$. The clients $102_1$-$102_n$ may have no knowledge of the presence of the web proxy server 120, that is, the web proxy server is transparent, although it is feasible to have one or more of the clients $102_1$-$102_n$ make requests to the web proxy server 120 to perform some operation on behalf of the clients $102_1$-$102_n$.

When the web proxy server 120 first receives a web request from the client (e.g., $102_1$), the web proxy server parses the request (via parsing logic 122) to determine what content is being requested, and typically searches a local cache 124 to see if the requested content is cached and still valid. This aspect is conventional caching for efficiency purposes, and is not described hereinafter except to note that acceleration via prediction and pre-fetching does not replace conventional caching, but rather integrates into conventional caching models and improves them.

In the event the requested content (e.g., the main page object, index.htm) is needed, the web proxy server 120 creates a web bequest for that object, as represented in FIG. 1 via the web request creator block labeled 126, and sends the request to the web server 112.

When the response corresponding to the main page object is received, a response handler 128 of the web proxy server 120 returns the response to the client $102_1$, and also provides the response to the parsing logic 122. Typically, the client $102_1$ will begin requesting objects listed in the main page response, using the limited number of (e.g., two) web connections a time corresponding to one request over each allowed connection.

However, instead of waiting for the client requests, the parsing logic 122 begins pre-fetching the objects listed on the main page object that the parsing logic 122 predicts the client $102_1$ will subsequently be requesting. Assuming these objects are not valid in the cache 124, the parsing logic 122 and web request creator 126 will begin issuing requests (RQ) to the web server.

More particularly, the web proxy server 120 parses each HTTP response returning from a Web server (e.g., the server 112). If the response is an HTML page, the web proxy server 120 parses its content looking for embedded objects including pictures, scripts, CSS file, other HTML pages, etc. For each embedded object, the web server 120 initiates an HTTP request to pre-fetch the object and have it to be served. When the client asks for the embedded object using an HTTP request, the web proxy server responds with an HTTP response containing the pre-fetched object.

For purposes of the present description with reference to FIG. 1, the web proxy server 120 is not limited to a limited number of requests such as two at a time, but rather may make any number, essentially multiple concurrent connections in parallel. As each response (RS, corresponding to a requested object) to each request (RQ) is received, the response handler 128 will store the objects in the cache 124 or in other temporary storage 130. Note that as described below, some objects are not allowed to be conventionally cached, and thus are stored in a different way whereby only the requesting client can obtain that object, e.g., only once or for a limited time such as within a few seconds. This may be accomplished via separate temporary storage 130 or by flagging the object as special in the cache 124.

As the client $102_1$ begins requesting the individual objects, the parsing logic 122 accesses the objects from the cache 124 or temporary storage 130. Note that the client $102_1$ may begin requesting the first limited number of objects before they are returned by the web server 112, in which event the client $102_1$ will need to wait, and non-cacheable objects may be directly returned without placing them in the temporary storage 130. However, because the client requests only the limited number of objects at a time before requesting more, the parallel requests made by the web proxy server 120 will obtain the objects faster than the client can request the next set.

The web proxy thus parallels the task of downloading the embedded objects with full transparency to the clients' web browsers. This is done by predicting the future HTTP requests and executing them in parallel using multiple concurrent connections. Returning to the previous example, the web proxy server 120 predicts the client's fifty HTTP requests, and pre-fetches them in parallel using fifty concurrent connections. Assuming the client is limited to two requests/concurrent connections, this reduces the page display time from 7.5 seconds to a 300 millisecond latency time (plus the 300 milliseconds to retrieve the main page).

Figure 2:
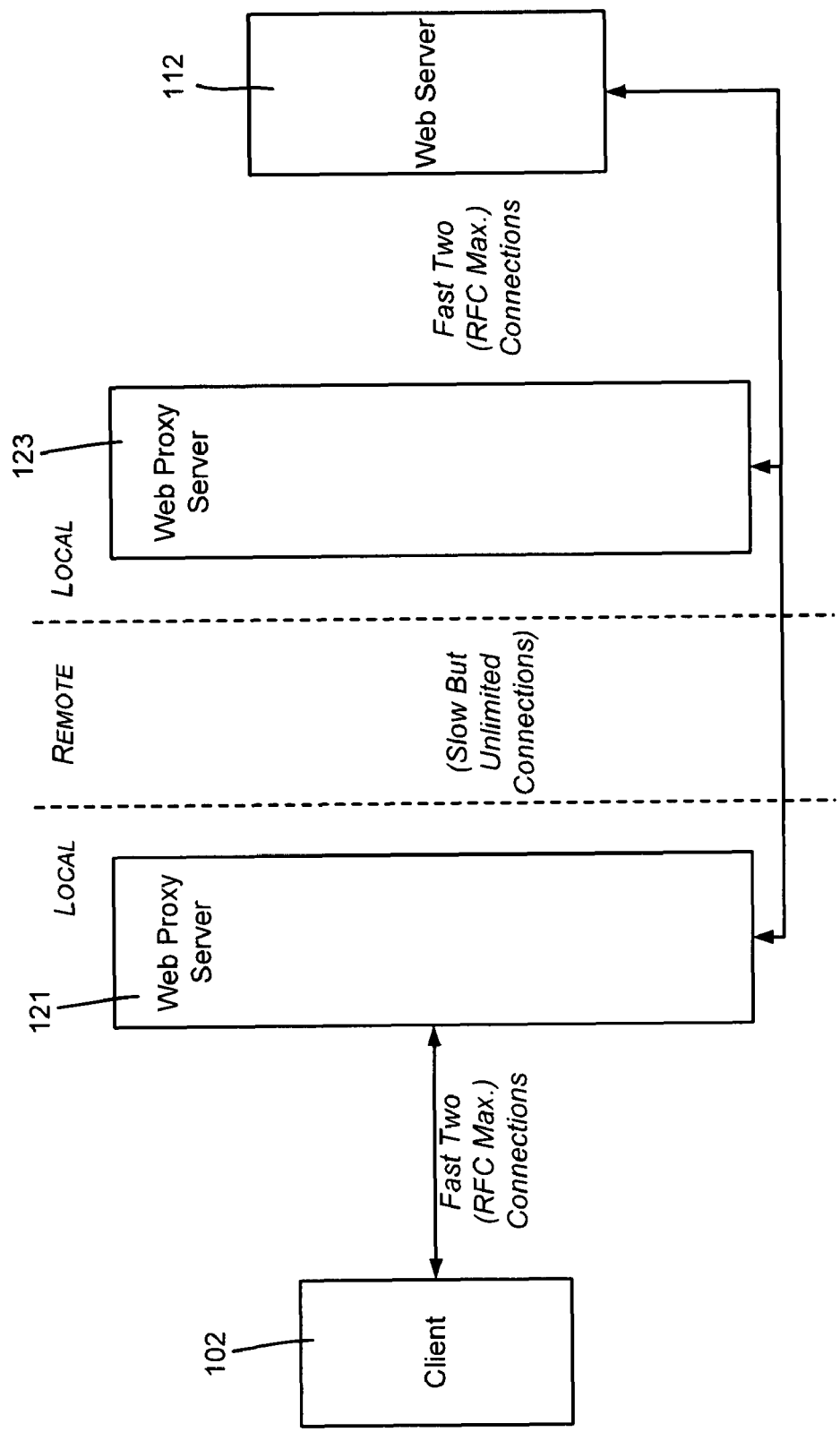
FIG. 2 shows an illustrative example of a network having two web proxy servers to reduce overall latency effects.

Turning to FIG. 2, there is represented an alternative configuration in which one web proxy server 121 is relatively close (low latency) with a client 102, and another web proxy server 123 is relatively close to a web server 110. For example, a corporate headquarters may have such a web proxy server 123 for its corporate clients.

As can be readily appreciated, the alternative configuration of FIG. 2 avoids increasing the number of request sent to a single web server 112 by having the additional web proxy server 123. The two web proxy servers 121 and 123 are connected at each end of the connection that suffers from high latency issues. The web proxy server that is local to the client acts as described above. However, while the web proxy server 123 that is local to the web server 112 only makes a limited number of (e.g., two) concurrent connections, this limitation does not significantly impact the overall result due to the relatively low latency between the web proxy server 123 and the web server 112. For example, using the above example with only two connections between the web proxy server 123 and the web server 112, but having each request consume only three milliseconds, the fifty requests (twenty-five over each of the two connections) will only add an additional seventy-five milliseconds to the three-hundred milliseconds described above.

Turning to an example operation performed at the web proxy server (120 or 121) close to the requesting client, FIG.

3 is a flow diagram having example steps beginning with a page request received from a client (step 302). Assuming caching is implemented, step 304 looks to the cache to determine whether the main page object (e.g., index.html) is present and valid in the cache. If not, at step 306 the HTTP requested is transparently forwarded to the web server (112, FIG. 1), or to the other web proxy server (123, FIG. 2).

Whether returned from the cache or the web server, step 308 represents returning the main HTML page object to the requesting client. Then, steps 310, 312 314, 316 and 318 begin verifying the objects are available in the cache or otherwise retrieving the objects as needed, e.g., from the server (step 314) into the cache when cacheable, or into the storage when not allowed to be cached. These steps correspond to the prediction (particularly step 310) and pre-fetching (particularly steps 314 and 316) aspects described above.

Figure 3:
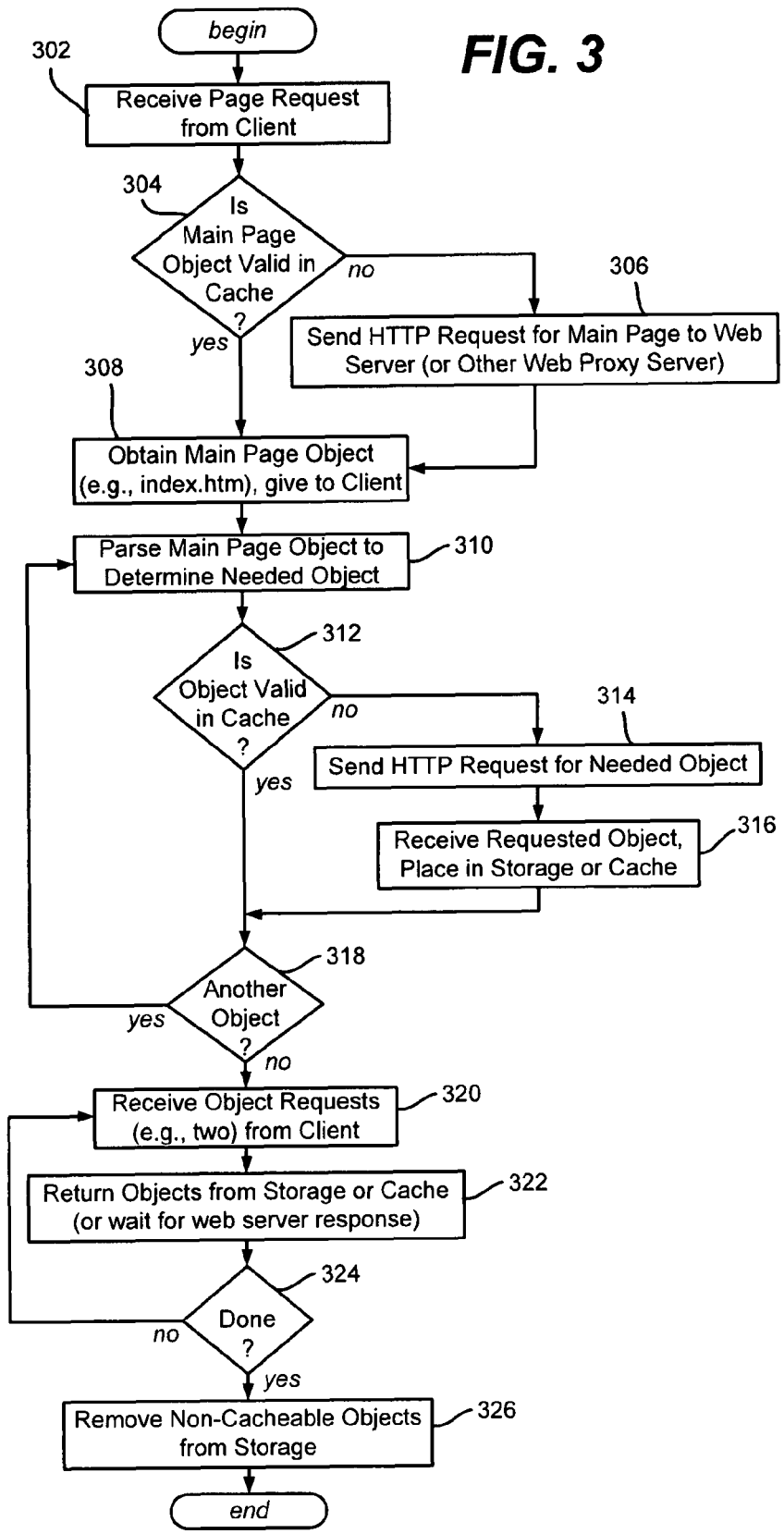
FIG. 3 is a flow diagram representing example steps taken by a web proxy server with prediction and pre-fetching capabilities.

Steps 320, 322 and 324 represent receiving and handling object requests from the client, e.g., two at a time. Note that although FIG. 3 shows step 320 occurring after the objects are already locally present in the proxy server's cache or storage, it is understood that the client may begin requesting objects that have not yet been returned, e.g., if the first two objects are not coincidentally cached, the client will likely request the first two objects (step 320) before they are returned from the web server at step 316. Thus, it is understood that at least some of the example steps of FIG. 3 are not necessarily serially performed.

Step 326 represents removing non-cacheable objects from the storage. More particularly, the time that a pre-fetched object is kept by the web proxy server waiting for a web browser request is limited, such as to a few seconds. In one aspect, this prevent a malicious client from taking down the proxy server by requesting only main pages without requesting the embedded objects, which would make the web proxy server consume more and more memory for the requested data without ever dropping that data and freeing up memory. Alternative removal methods include removing objects based on space or other limitations being reached, and so forth.

Note that a non-cacheable object may also removed from storage as soon as it is served to a requesting client, but in any event will be removed at least by the limited temporary storage time or other removal method. To prevent another client from seeing an object's content while temporarily stored, non-cacheable content is only served to the client that requested it, by maintaining an association between requesting clients and non-cacheable objects until deleted. Step 324 of FIG. 3 thus may represent considering a request done because all embedded objects listed on the main page have been served to the client, or because a time to request the non-served objects has expired or another method has triggered their removal.

Exemplary Operating Environment

Figure 4:
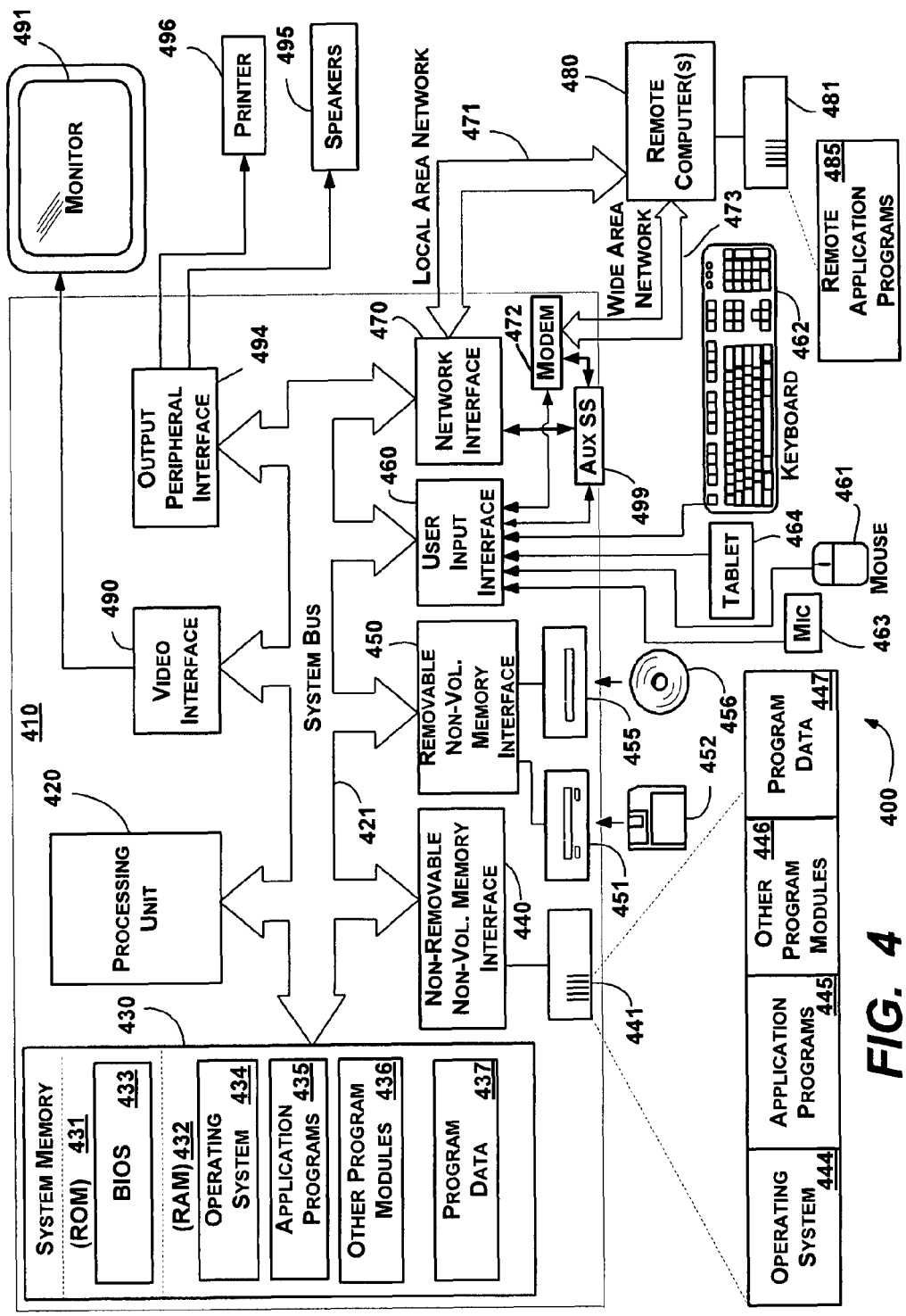
FIG. 4 shows an illustrative example of a general-purpose network computing environment into which various aspects of the present invention may be incorporated.

FIG. 4 illustrates an example of a suitable computing system environment 400 on which the web proxy server 120 (FIG. 1) or 121 (FIG. 2) may be implemented, for example. The computing system environment 400 is only one example of a suitable computing environment and is not intended to suggest any limitation as to the people of use or functionality of the invention. Neither should the computing environment 400 be interpreted as having any dependency or requirement relating to any one or combination of components illustrated in the exemplary operating environment 400.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks awe performed by remote processing devices that are linked through a communications network. In a distributed computing environment, program modules may be located in local and/or remote computer storage media including memory storage devices.

With reference to FIG. 4, an exemplary system for implementing various aspects of the invention may include a general purpose computing device in the form of a computer 410. Components of the computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 410 typically includes a variety of computer-readable media. Computer-readable media can be any available media that can be accessed by the computer 410 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 410. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as, during startup, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436 and program data 437.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media, described above and illustrated in FIG. 4, provide storage of computer-readable instructions, data structures, program modules and other data for the computer 410. In FIG. 4, for example, hard disk drive 441 is illustrated as storing operating system 444, application programs 445, other program modules 446 and program data 447. Note that these components can either be the same as or different from operating system 434, application programs 435, other program modules 436, and program data 437. Operating system 444, application programs 445, other program modules 446, and program data 447 are given different numbers herein to illustrate that, at a minimum, they are different copies. A user may enter commands and information into the computer 410 through input devices such as a tablet, or electronic digitizer, 464, a microphone 463, a keyboard 462 and pointing device 461, commonly referred to as mouse, trackball or touch pad. Other input devices not shown in FIG. 4 may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. The monitor 491 may also be integrated with a touch-screen panel or the like. Note that the monitor and/or touch screen panel can be physically coupled to a housing in which the computing device 410 is incorporated, such as in a tablet-type personal computer. In addition, computers such as the computing device 410 may also include other peripheral output devices such as speakers 495 and printer 496, which may be connected through an output peripheral interface 494 or the like.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 4. The logical connections depicted in FIG. 4 include one or more local area networks (LAN) 471 and one or more wide area networks (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460 or other appropriate mechanism. A wireless networking component 474 such as comprising an interface and antenna may be coupled through a suitable device such as an access point or peer computer to a WAN or LAN. In a networked environment, program modules depicted relative to the computer 410, or portions thereof, may be stored in the remote memory storage device. By way of example, and not limitation, FIG. 4 illustrates remote application programs 485 as residing on memory device 481. It may be appreciated that the network connections shown are exemplary and other means of establishing a communications link between the computers may be used.

An auxiliary subsystem 499 (e.g., for auxiliary display of content) may be connected via the user interface 460 to allow data such as program content, system status and event notifications to be provided to the user, even if the main portions of the computer system are in a low power state. The auxiliary subsystem 499 may be connected to the modem 472 and/or network interface 470 to allow communication between these systems while the main processing unit 420 is in a low power state.

CONCLUSION

While the invention is susceptible to various modifications and alternative constructions, certain illustrated embodiments thereof are shown in the drawings and have been described above in detail. It should be, understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising:
   analyzing content described on a main web page to predict likely subsequent requests from a client for a plurality of objects corresponding to that content; and
   pre-fetching at least some of the content before that content is requested by the client by making in parallel concurrent requests for objects described on the main web page independent of client requests for those objects, wherein pre-fetching at least some of the content comprises sending requests for objects to a web proxy coupled to a web server, and, the web proxy server coupled to the web server sends only two requests at a time to the web server independent of the number of outstanding requests received from the client.

2. The method of claim 1 wherein pre-fetching at least some of the content comprises sending HTTP requests for objects to a web server.

3. The method of claim 1 wherein pre-fetching at least some of the content comprises, receiving an object, and storing the object in a local storage or memory, and further comprising, returning the object from the local storage in response to a client request for the object.

4. The method of claim 3 wherein the object comprises a non-cacheable object, and further comprising, removing the object from the local storage or memory once requested by the client and returned to the client in response to the request.

5. The method of claim 3 wherein the object comprises a non-cacheable object, and further comprising, removing the object from the local storage when not requested by the client and in response to a removal triggering event.

6. The method of claim 1 wherein pre-fetching at least some of the content comprises, receiving an object, determining that the object is cacheable, and storing the object in a content cache.

7. In a computer networking environment, a system comprising:

a local web proxy server that receives requests from a client for content directed towards a web server, the local web proxy server analyzes the requests, sends HTTP requests to a web proxy server local to the web server, to pre-fetch at least some content objects from the web server in parallel and independent of client request for the objects, and returns objects to the client in response to client requests for those objects, wherein the web proxy server local to the web server sends only two HTTP requests at a time to the web server independent of the number of outstanding HTTP requests received from the local web proxy server.

8. The system of claim 7 wherein the local web proxy server pre-fetches at least some of the content including by sending HTTP requests for the objects to the web server.

9. The system of claim 7 wherein the local web proxy server pre-fetches at least some of the content by storing received objects in a local storage or memory for returning to the client in response to client requests for the objects.

10. The system of claim 7 wherein the local web proxy server differentiates between cacheable objects and non-cacheable objects, and wherein the local web proxy server removes any stored non-cacheable objects once requested by and returned to the client, or if not requested by the client when a removal event occurs.

11. A computer-readable storage medium having computer-executable instructions, comprising:

receiving a request from a client for web content corresponding to a main web page;

forwarding the request for handling via a corresponding web server;

receiving a response from the web server, the response including a list of embedded objects;

returning the response to the client;

requesting the embedded objects from a remote web proxy server independent of requests from the client for those embedded objects, wherein the remote web proxy server requests up to two of the embedded objects at a time from the web server;

receiving the embedded objects; and returning the embedded objects in response to client requests for those embedded objects.

12. The computer-readable storage medium of claim 11 wherein requesting the embedded objects comprises requesting each embedded object before any embedded object is returned, and having further computer-executable instructions comprising, storing each embedded object when returned for returning to the client upon a client request for that object.

13. The computer-readable storage medium of claim 12 wherein storing each embedded object comprises, caching the embedded object if cacheable, or deleting the embedded object when not cacheable after returning the embedded object to the client.

14. The computer-readable storage medium of claim 13 having further computer-executable instructions comprising, caching the main web page, and returning the main web page or a cached embedded object from the cache in response to a subsequent request for that main web page or cached embedded object from a different client.

15. The computer-readable storage medium of claim 11 wherein requesting the embedded objects comprises creating web requests and sending the web requests to the web server independent of receiving server responses to the web requests.

* * * * *